US010049431B2

United States Patent
Leng et al.

(10) Patent No.: US 10,049,431 B2
(45) Date of Patent: Aug. 14, 2018

(54) LOCKING A GROUP OF IMAGES TO A DESIRED LEVEL OF ZOOM AND AN OBJECT OF INTEREST BETWEEN IMAGE TRANSITIONS

(71) Applicant: QUALCOMM Incorporated, San Diego, CA (US)

(72) Inventors: Bing Leng, San Diego, CA (US); Suzana Arellano, San Diego, CA (US); Daniel Rivas, San Diego, CA (US); Bing-Hsun Wu, Ann Arbor, MI (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/398,389

(22) Filed: Jan. 4, 2017

(65) Prior Publication Data
US 2018/0018754 A1     Jan. 18, 2018

Related U.S. Application Data

(60) Provisional application No. 62/363,790, filed on Jul. 18, 2016.

(51) Int. Cl.
G06T 3/40     (2006.01)
H04N 5/262    (2006.01)
(Continued)

(52) U.S. Cl.
CPC ............ *G06T 3/40* (2013.01); *G06F 3/04842* (2013.01); *G06K 9/3233* (2013.01); *G06T 7/70* (2017.01);
(Continued)

(58) Field of Classification Search
CPC ....................................................... G06T 3/40
See application file for complete search history.

(56) References Cited

U.S. PATENT DOCUMENTS 9,182,902 B2   11/2015   Lin et al.
2008/0279480 A1  11/2008   Inamoto et al.
(Continued)

FOREIGN PATENT DOCUMENTS

EP    3130993 A1    2/2017
GB    2379823 A     3/2003

OTHER PUBLICATIONS

Kost J., "Locking the Zoom Position in Lightroom", Nov. 25, 2014, Retrieved from Internet on Oct. 5, 2016, http://blogs.adobe.com/jkost/2014/11/locking-the-zoom-position-inlightroom.html, pp. 1-2.
(Continued)

*Primary Examiner* — Jeffery A Brier
(74) *Attorney, Agent, or Firm* — Muncy, Geissler, Olds & Lowe, P.C.

(57) ABSTRACT

In an embodiment, a user equipment (UE) groups a plurality of images. The UE displays a first image among the plurality of images, determines an object of interest within the first image and a desired level of zoom, and determines to lock onto the object of interest in association with one or more transitions between the plurality of images. The UE determines to transition to a second image among the plurality of images, and detects, based on the lock determination, the object of interest within the second image. The UE displays the second image by zooming-in upon the object of interest at a level of zoom that corresponds to the desired level of zoom.

27 Claims, 9 Drawing Sheets

(51) Int. Cl.
*G06K 9/32* (2006.01)
*G06T 7/70* (2017.01)
*G06F 3/0484* (2013.01)

(52) U.S. Cl.
CPC . *H04N 5/2628* (2013.01); *G06F 2203/04806* (2013.01); *G06T 2207/10004* (2013.01)

(56) References Cited

U.S. PATENT DOCUMENTS

| | | | |
|---|---|---|---|
| 2009/0128618 A1* | 5/2009 | Fahn | G06K 9/2054 348/39 |
| 2009/0128647 A1* | 5/2009 | Fahn | G01S 3/7865 348/221.1 |
| 2015/0170333 A1* | 6/2015 | Jing | G06T 3/40 345/660 |
| 2015/0268822 A1 | 9/2015 | Waggoner et al. | |
| 2015/0279021 A1* | 10/2015 | Wu | G06T 3/40 382/103 |
| 2016/0062571 A1 | 3/2016 | Dascola et al. | |
| 2016/0125228 A1 | 5/2016 | Son et al. | |

OTHER PUBLICATIONS

Xodo Blog: "Disabling Maintain Zoom Level—Feedback for Xodo Docs", Retrieved from Internet on Oct. 5, 2016, http://feedback.xodo.com/knowledgebase/articles/893397 pp. 1-4.
International Search Report and Written Opinion—PCT/US2017/036995—ISA/EPO—dated Aug. 23, 2017.

\* cited by examiner

LOCKING A GROUP OF IMAGES TO A DESIRED LEVEL OF ZOOM AND AN OBJECT OF INTEREST BETWEEN IMAGE TRANSITIONS

CROSS-REFERENCE TO RELATED APPLICATION

The present application for patent claims the benefit of U.S. Provisional Application No. 62/363,790, entitled "UPDATING METADATA FOR OFFLINE MEDIA FILES BASED ON CROWD-SOURCED METADATA INFORMATION OF A SOCIAL NETWORKING SERVICE, LOCKING A GROUP OF IMAGES TO A DESIRED LEVEL OF ZOOM AND AN OBJECT OR AREA OF INTEREST BETWEEN IMAGE TRANSITIONS, AND SELECTIVELY DELETING OR COMPRESSING A MEDIA FILE IN LOCAL STORAGE ON A USER EQUIPMENT BASED ON AT LEAST ONE ATTRIBUTE OF THE MEDIA FILE OR CONTEXTUAL INFORMATION RELATED TO THE MEDIA FILE", filed Jul. 18, 2016, which is by the same inventors as the subject application, assigned to the assignee hereof and hereby expressly incorporated by reference herein in its entirety.

BACKGROUND

1. Field of the Disclosure

Embodiments relate to locking a group of images to a desired level of zoom and an object of interest between image transitions.

2. Description of the Related Art

It is common for images to be captured by users in a bursty manner. For example, even though a user may ultimately want to settle on a limited number of representative pictures (e.g., of a group of people standing in front of a landmark, of a new baby, etc.), the user may take a relatively high number of pictures in an image capture session to ensure that at least one of the pictures will be satisfactory (e.g., all people in the image have their eyes open, etc.). After an image capture session, the user will typically view the images captured during the image capture session one-by-one on his/her image capture device to delete unsatisfactory images, etc. If the user is interested in a particular target feature that is present in most or all of the images (e.g., one particular person's face, a particular animal at a zoo, a particular cloud in the sky, etc.), the user may want to zoom-in to focus on the target feature to evaluate the image. In this case, the user may be required to manually zoom to the target feature each time the user transitions to a new image from the image capture session.

SUMMARY

An embodiment is directed to a method of operating a user equipment (UE), including grouping a plurality of images, displaying a first image among the plurality of images, determining an object of interest within the first image and a desired level of zoom, determining to lock onto the object of interest in association with one or more transitions between the plurality of images, determining to transition to a second image among the plurality of images, detecting, based on the lock determination, the object of interest within the second image, and displaying the second image by zooming-in upon the object of interest at a level of zoom that corresponds to the desired level of zoom.

Another embodiment is directed to a user equipment (UE), including means for grouping a plurality of images, means for displaying a first image among the plurality of images, means for determining an object of interest within the first image and a desired level of zoom, means for determining to lock onto the object of interest in association with one or more transitions between the plurality of images, means for determining to transition to a second image among the plurality of images, means for detecting, based on the lock determination, the object of interest within the second image, and means for displaying the second image by zooming-in upon the object of interest at a level of zoom that corresponds to the desired level of zoom.

An embodiment is directed to a UE, including at least one processor coupled to user interface output circuitry and configured to group a plurality of images, display a first image among the plurality of images, determine an object of interest within the first image and a desired level of zoom, determine to lock onto the object of interest in association with one or more transitions between the plurality of images, determine to transition to a second image among the plurality of images, detect, based on the lock determination, the object of interest within the second image, and display the second image by zooming-in upon the object of interest at a level of zoom that corresponds to the desired level of zoom.

An embodiment is directed to a non-transitory computer-readable medium containing instructions stored thereon, which, when executed by a UE, cause the UE to perform operations, the instructions including at least one instruction to cause the UE to group a plurality of images, at least one instruction to cause the UE to display a first image among the plurality of images, at least one instruction to cause the UE to determine an object of interest within the first image and a desired level of zoom, at least one instruction to cause the UE to determine to lock onto the object of interest in association with one or more transitions between the plurality of images, at least one instruction to cause the UE to determine to transition to a second image among the plurality of images, at least one instruction to cause the UE to detect, based on the lock determination, the object of interest within the second image, and at least one instruction to cause the UE to display the second image by zooming-in upon the object of interest at a level of zoom that corresponds to the desired level of zoom.

BRIEF DESCRIPTION OF THE DRAWINGS

A more complete appreciation of embodiments of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
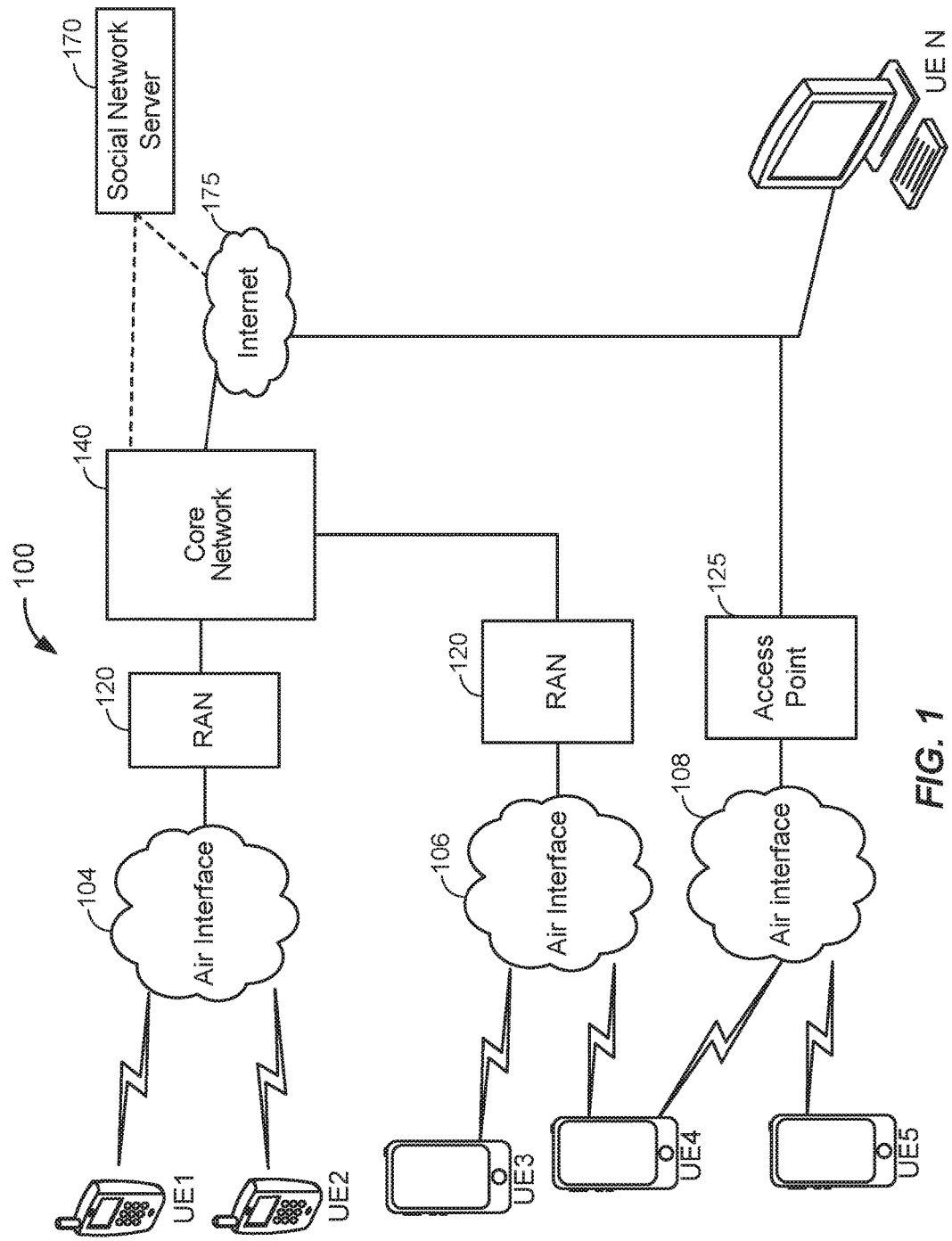
FIG. 1 illustrates a high-level system architecture of a wireless communications system in accordance with an embodiment of the disclosure.

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., a RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 may include a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 may include configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175.

The Internet 175, in some examples includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UEs 1 . . . N via the core network 140. Also shown in FIG. 1 is the access point 125 that is separate from the RAN 120. The access point 125 may be connected to the Internet 175 independent of the core network 140 (e.g., via an optical communications system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a social network server 170 is shown as connected to the Internet 175, the core network 140, or both. The social network server 170 can be implemented as a plurality of structurally separate servers, or alternately may correspond to a single server. As will be described below in more detail, the social network server 170 is configured to support a social networking service (e.g., Facebook, Myspace, Google+, etc.) with respect to UEs that can connect to the social network server 170 via the core network 140 and/or the Internet 175.

Figure 2:
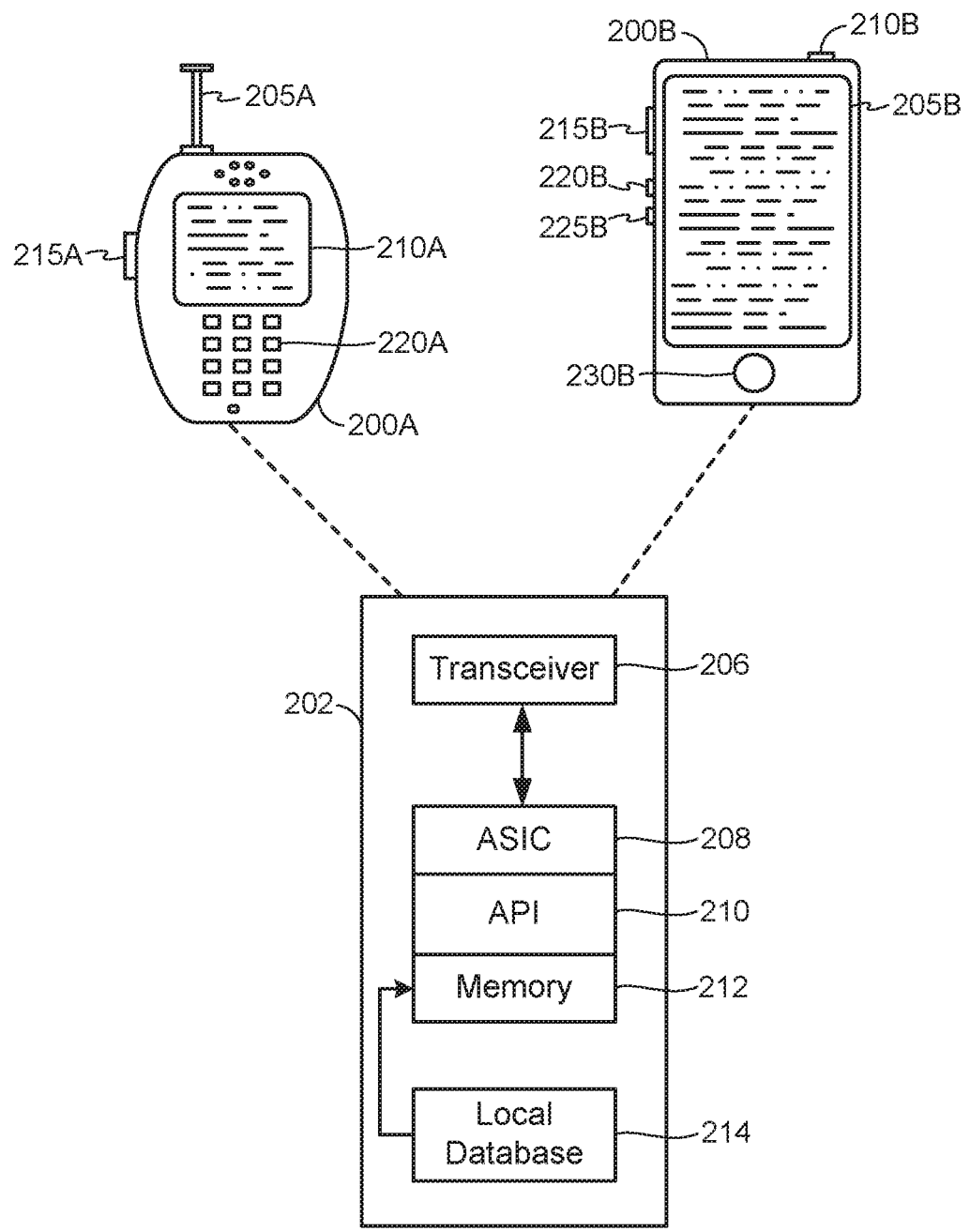
FIG. 2 illustrates examples of user equipments (UEs) in accordance with embodiments of the disclosure.

FIG. 2 illustrates examples of UEs (i.e., client devices) in accordance with embodiments of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), and at least one front-panel button 230B (e.g., a Home button, etc.), among other components, as is known in the art. While not shown explicitly as part of UE 200B, UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., social network server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in a memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in the memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, the ASIC 208, the memory 212, the API 210 and the local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communications between UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the disclosure and are merely to aid in the description of aspects of embodiments of the disclosure.

Figure 3:
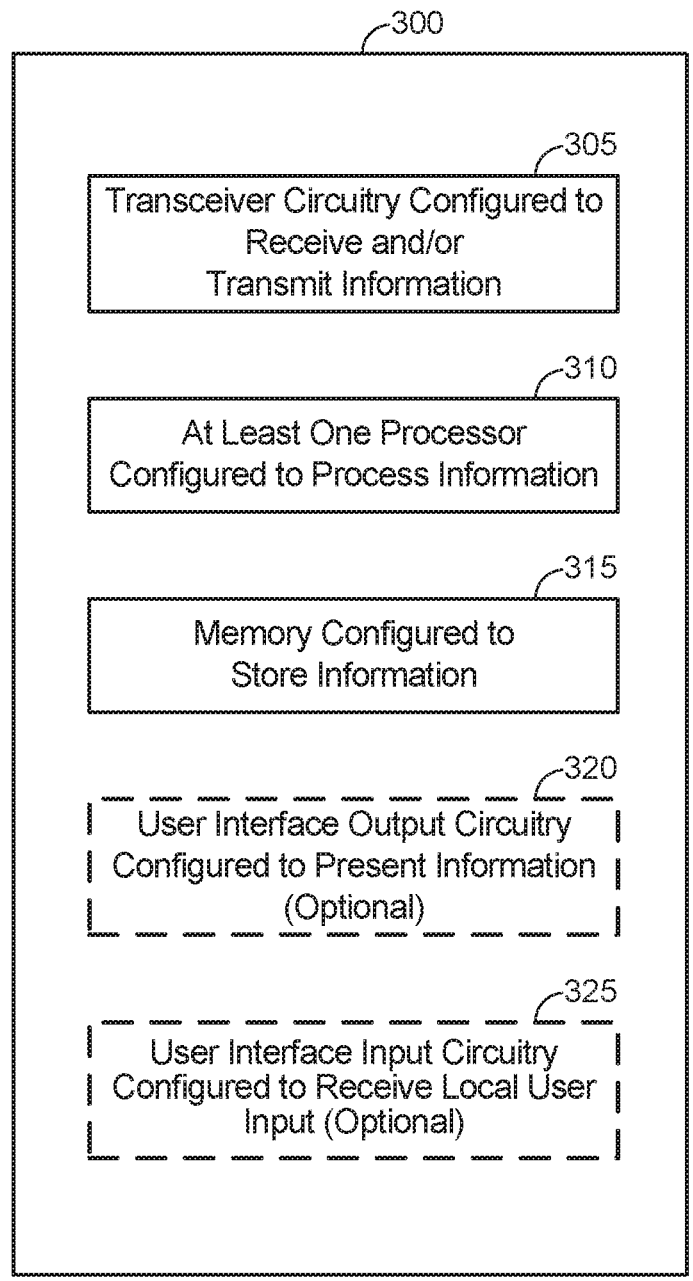
FIG. 3 illustrates a communications device that includes structural components in accordance with an embodiment of the disclosure.

FIG. 3 illustrates a communications device 300 that includes structural components in accordance with an embodiment of the disclosure. The communications device 300 can correspond to any of the above-noted communications devices, including but not limited to UEs 1 . . . N, UEs 200A and 200B, any component included in the RAN 120 such as base stations, access points or eNodeBs, any component of the core network 140, an components coupled to the Internet 175 (e.g., the social network server 170), and so on. Thus, communications device 300 can correspond to any electronic device that is configured to communicate with (or facilitate communication with) one or more other entities over the wireless communications systems 100 of FIG. 1.

Referring to FIG. 3, the communications device 300 includes transceiver circuitry configured to receive and/or transmit information 305. In an example, if the communications device 300 corresponds to a wireless communications device (e.g., UE 200A or UE 200B), the transceiver circuitry configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the transceiver circuitry configured to receive and/or transmit information 305 can correspond to a wired communications interface (e.g., a serial connection, a USB or Firewire connection, an Ethernet connection through which the Internet 175 can be accessed, etc.). Thus, if the communications device 300 corresponds to some type of network-based server (e.g., the social network server 170), the transceiver circuitry configured to receive and/or transmit information 305 can correspond to an Ethernet card, in an example, that connects the network-based server to other communication entities via an Ethernet protocol. In a further example, the transceiver circuitry configured to receive and/or transmit information 305 can include sensory or measurement hardware by which the communications device 300 can monitor its local environment (e.g., an accelerometer, a temperature sensor, a light sensor, an antenna for monitoring local RF signals, etc.). The transceiver circuitry configured to receive and/or transmit information 305 can also include software that, when executed, permits the associated hardware of the transceiver circuitry configured to receive and/or transmit information 305 to perform its reception and/or transmission function(s). However, the transceiver circuitry configured to receive and/or transmit information 305 does not correspond to software alone, and the transceiver circuitry configured to receive and/or transmit information 305 relies at least in part upon structural hardware to achieve its functionality. Moreover, the transceiver circuitry configured to receive and/or transmit information 305 may be implicated by language other than "receive" and "transmit", so long as the underlying function corresponds to a receive or transmit function. For an example, functions such as obtaining, acquiring, retrieving, measuring, etc., may be performed by the transceiver circuitry configured to receive and/or transmit information 305 in certain contexts as being specific types of receive functions. In another example, functions such as sending, delivering, conveying, forwarding, etc., may be performed by the transceiver circuitry configured to receive and/or transmit information 305 in certain contexts as being specific types of transmit functions. Other functions that correspond to other types of receive and/or transmit functions may also be performed by the transceiver circuitry configured to receive and/or transmit information 305.

Referring to FIG. 3, the communications device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communications device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform its processing function(s). However, the at least one processor configured to process information 310 does not correspond to software alone, and the at least one processor configured to process information 310 relies at least in part upon structural hardware to achieve its functionality. Moreover, the at least one processor configured to process information 310 may be implicated by language other than "processing", so long as the underlying function corresponds to a processing function. For an example, functions such as evaluating, determining, calculating, identifying, etc., may be performed by the at least one processor configured to process information 310 in certain contexts as being specific types of processing functions. Other functions that correspond to other types of processing functions may also be performed by the at least one processor configured to process information 310.

Referring to FIG. 3, the communications device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform its storage function(s). However, the memory configured to store information 315 does not correspond to software alone, and the memory configured to store information 315 relies at least in part upon structural hardware to achieve its functionality. Moreover, the memory configured to store information 315 may be implicated by language other than "storing", so long as the underlying function corresponds to a storing function. For an example, functions such as caching, maintaining, etc., may be performed by the memory configured to store information 315 in certain contexts as being specific types of storing functions. Other functions that correspond to other types of storing functions may also be performed by the memory configured to store information 315.

Referring to FIG. 3, the communications device 300 further optionally includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communications device 300. For example, if the communications device 300 corresponds to the UE 200A and/or UE 200B as shown in FIG. 2, the user interface output circuitry configured to present information 320 can include the display 226. In a further example, the user interface output circuitry configured to present information 320 can be omitted for certain communications devices, such as network communications devices that do not have a local user (e.g., network switches or routers, remote servers, etc.). The user interface output circuitry configured to present information 320 can also include software that, when executed, permits the associated hardware of the user interface output circuitry configured to present information 320 to perform its presentation function(s). However, the user interface output circuitry configured to present information 320 does not correspond to software alone, and the user interface output circuitry configured to present information 320 relies at least in part upon structural hardware to achieve its functionality. Moreover, the user interface output circuitry configured to present information 320 may be implicated by language other than "presenting", so long as the underlying function corresponds to a presenting function. For an example, functions such as displaying, outputting, prompting, conveying, etc., may be performed by the user interface output circuitry configured to present information 320 in certain contexts as being specific types of presenting functions. Other functions that correspond to other types of storing functions may also be performed by the user interface output circuitry configured to present information 320.

Referring to FIG. 3, the communications device 300 further optionally includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communications device 300. For example, if the communications device 300 corresponds to UE 200A or UE 200B as shown in FIG. 2, the user interface input circuitry configured to receive local user input 325 can include the buttons 220A, the display 210A (if a touchscreen), etc. In a further example, the user interface input circuitry configured to receive local user input 325 can be omitted for certain communications devices, such as network communications devices that do not have a local user (e.g., network switches or routers, remote servers, etc.). The user interface input circuitry configured to receive local user input 325 can also include software that, when executed, permits the associated hardware of the user interface input circuitry configured to receive local user input 325 to perform its input reception function(s). However, the user interface input circuitry configured to receive local user input 325 does not correspond to software alone, and the user interface input circuitry configured to receive local user input 325 relies at least in part upon structural hardware to achieve its functionality. Moreover, the user interface input circuitry configured to receive local user input 325 may be implicated by language other than "receiving local user input", so long as the underlying function corresponds to a receiving local user function. For an example, functions such as obtaining, receiving, collecting, etc., may be performed by the user interface input circuitry configured to receive local user input 325 in certain contexts as being specific types of receiving local user functions. Other functions that correspond to other types of receiving local user input functions may also be performed by the user interface input circuitry configured to receive local user input 325.

Referring to FIG. 3, while the configured structural components of 305 through 325 are shown as separate or distinct blocks in FIG. 3 that are implicitly coupled to each other via an associated communication bus (not shown expressly), it will be appreciated that the hardware and/or software by which the respective configured structural components of 305 through 325 performs their respective functionality can overlap in part. For example, any software used to facilitate the functionality of the configured structural components of 305 through 325 can be stored in the non-transitory memory associated with the memory configured to store information 315, such that the configured structural components of 305 through 325 each performs their respective functionality (i.e., in this case, software execution) based in part upon the operation of software stored by the memory configured to store information 315. Likewise, hardware that is directly associated with one of the configured structural components of 305 through 325 can be borrowed or used by other of the configured structural components of 305 through 325 from time to time. For example, the at least one processor configured to process information 310 can format data into an appropriate format before being transmitted by the transceiver circuitry configured to receive and/or transmit information 305, such that the transceiver circuitry configured to receive and/or transmit information 305 performs its functionality (i.e., in this case, transmission of data) based in part upon the operation of structural hardware associated with the at least one processor configured to process information 310.

Figure 4:
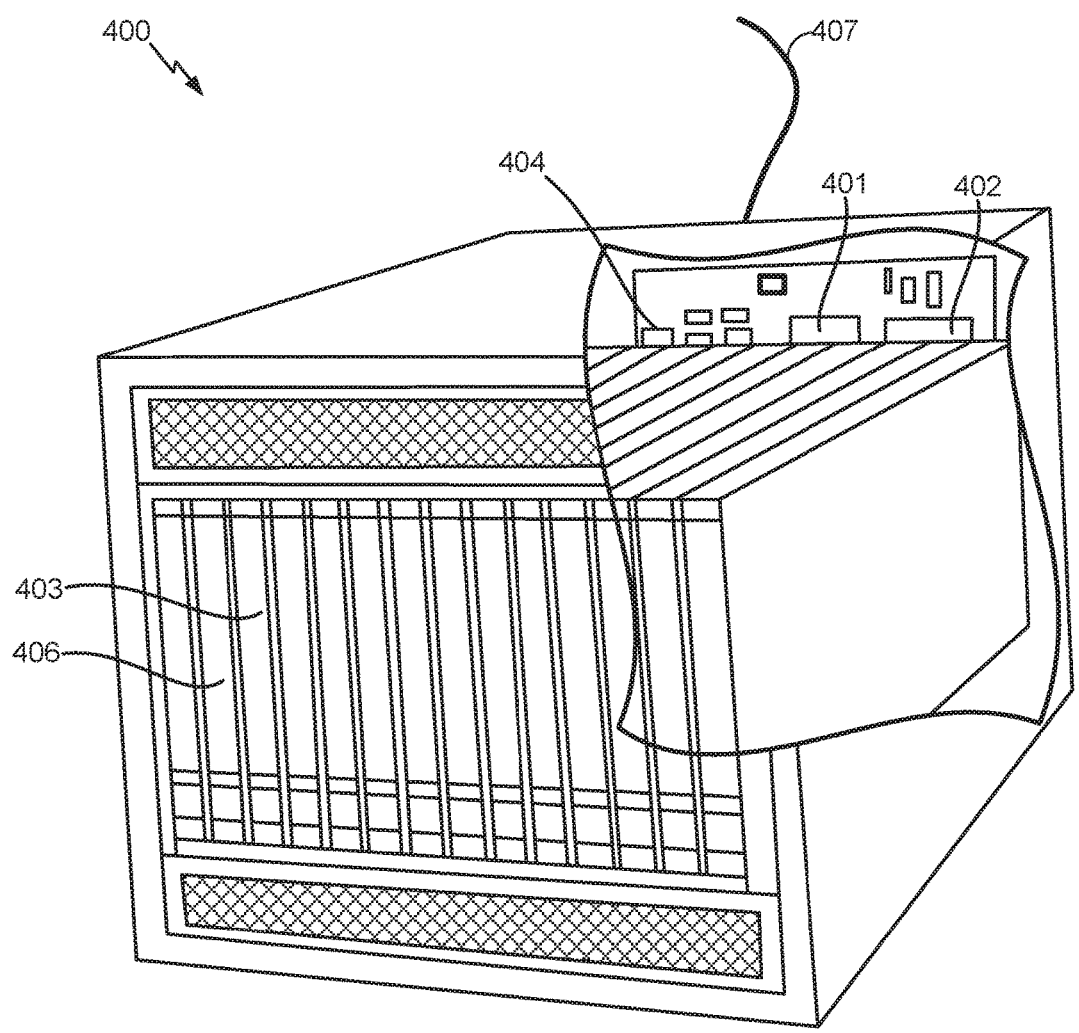
FIG. 4 illustrates a server in accordance with an embodiment of the disclosure.

The various embodiments may be implemented on any of a variety of commercially available server devices, such as server 400 illustrated in FIG. 4. In an example, the server 400 may correspond to one example configuration of the social network server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communications device 300, whereby the transceiver circuitry configured to transmit and/or receive information 305 corresponds to the network access points 404 used by the server 400 to communicate with the network 407, the at least one processor configured to process information 310 corresponds to the processor 401, and the memory configuration to store information 315 corresponds to any combination of the volatile memory 402, the disk drive 403 and/or the disc drive 406. The optional user interface output circuitry configured to present information 320 and the optional user interface input circuitry configured to receive local user input 325 are not shown explicitly in FIG. 4 and may or may not be included therein. Thus, FIG. 4 helps to demonstrate that the communications device 300 may be implemented as a server, in addition to a UE as in FIG. 2.

It is common for images to be captured by users in a bursty manner. For example, even though a user may ultimately want to settle on a limited number of representative pictures (e.g., of a group of people standing in front of a landmark, of a new baby, etc.), the user may take a relatively high number of pictures in an image capture session to ensure that at least one of the pictures will be satisfactory (e.g., all people in the image have their eyes open, etc.). After an image capture session, the user will typically view the images captured during the image capture session one-by-one on his/her image capture device to delete unsatisfactory images, etc. If the user is interested in a particular target feature that is present in most or all of the images (e.g., one particular person's face, a particular animal at a zoo, a particular cloud in the sky, etc.), the user may want to zoom-in to focus on the target feature to evaluate the image. In this case, the user may be required to manually zoom to the target feature each time the user transitions to a new image from the image capture session.

Figure 5:
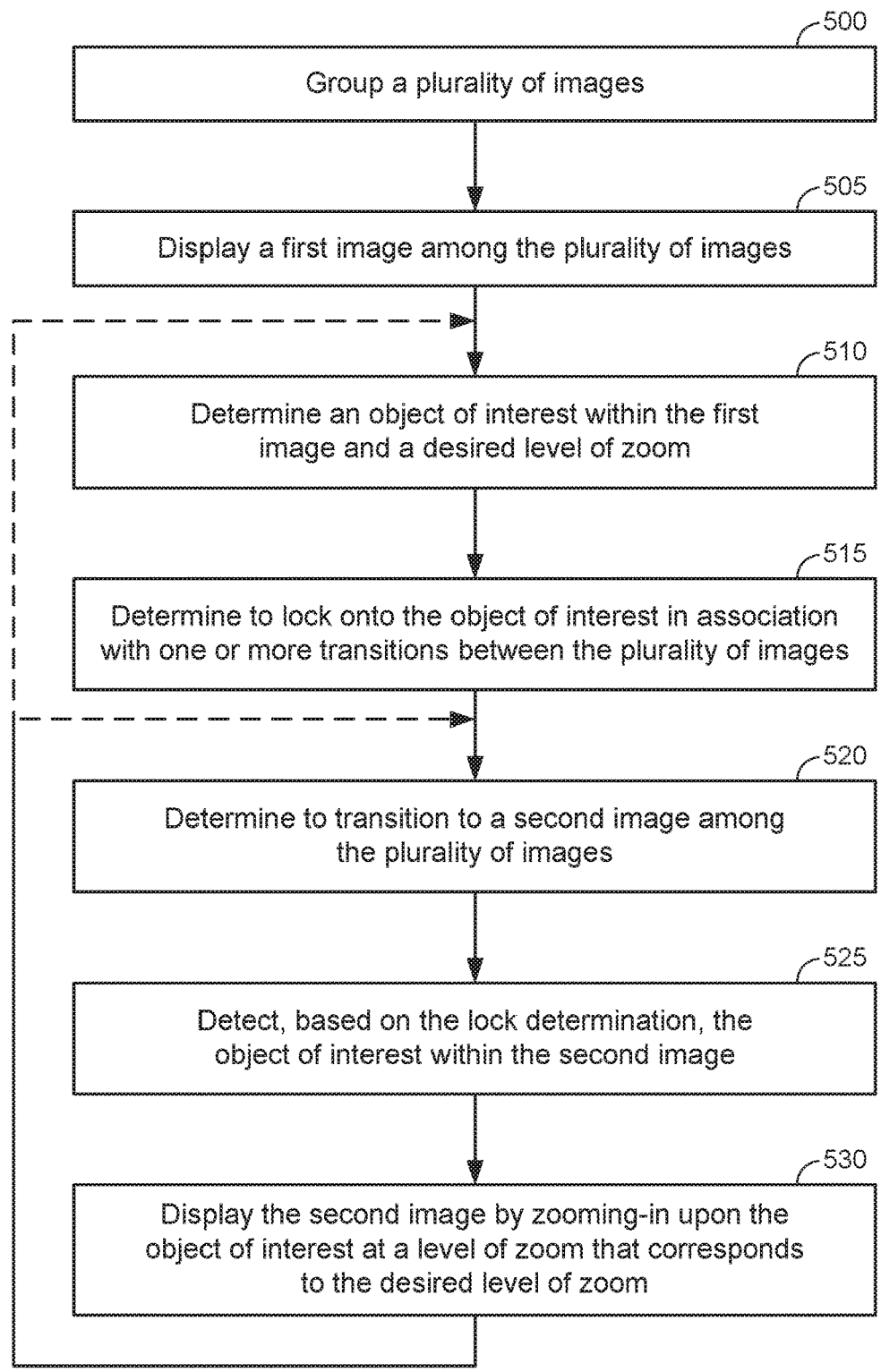
FIG. 5 illustrates a process of controlling how a series of images are displayed to a user in accordance with an embodiment of the disclosure.
Figure 6:
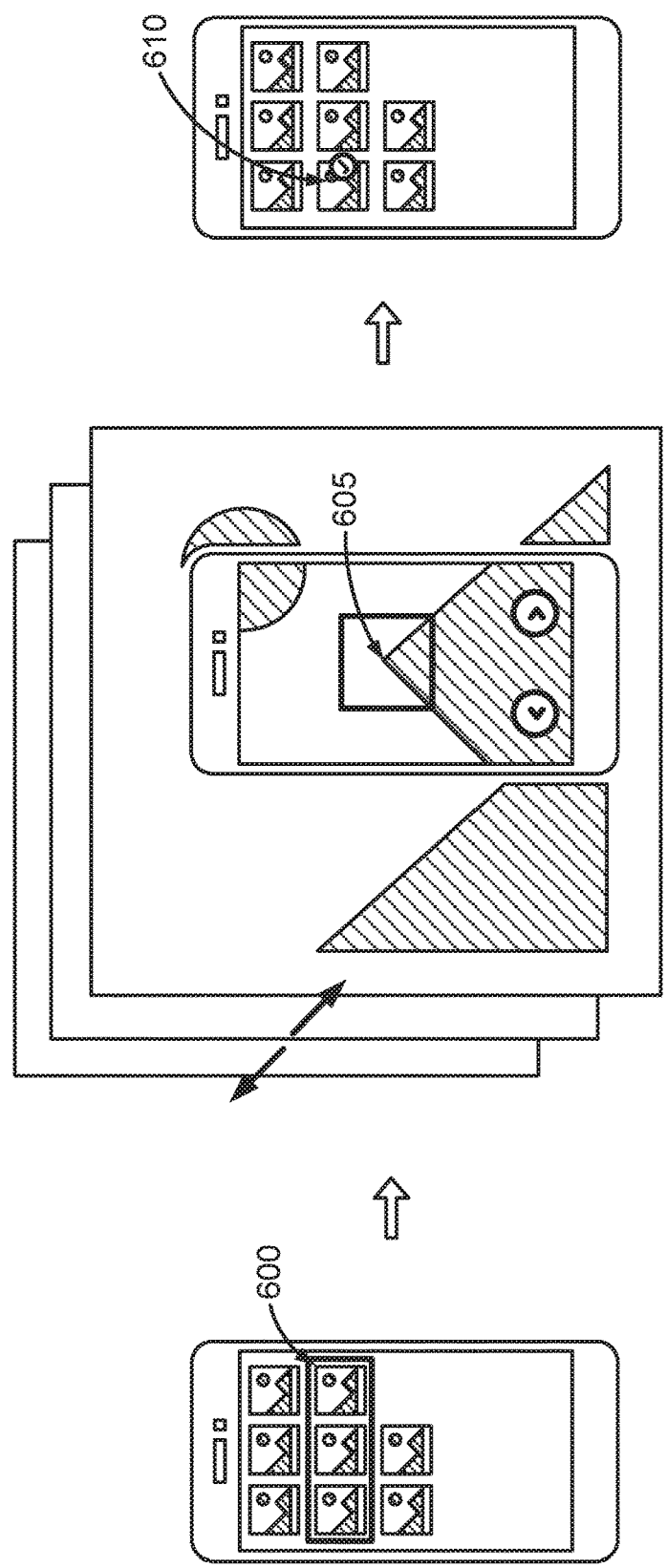
FIGS. 6-7 illustrate example implementations of portions of the process of FIG. 5 in accordance with embodiments of the disclosure.
Figure 7:
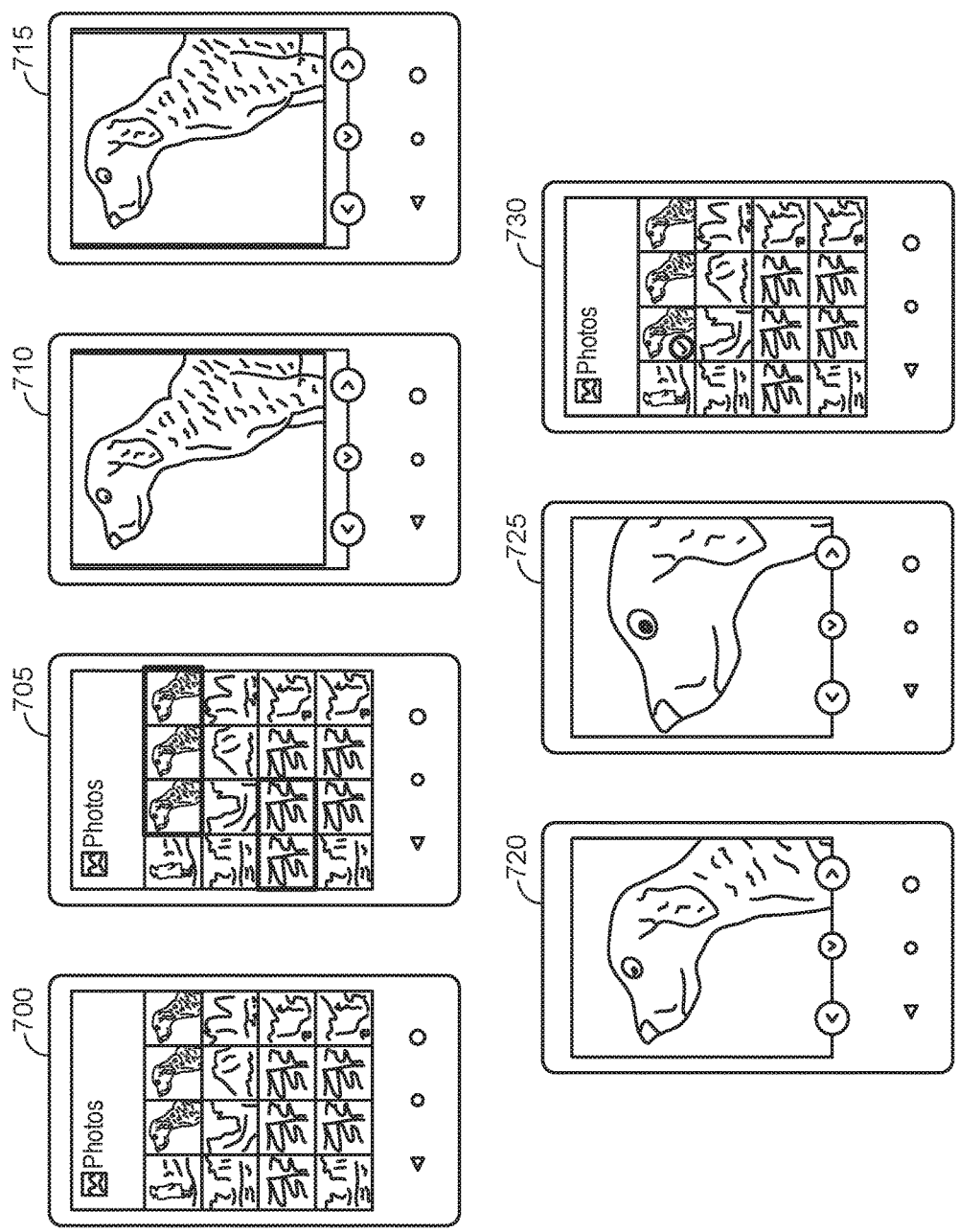

FIG. 5 illustrates a process of controlling how a series of images are displayed to a user in accordance with an embodiment of the disclosure. FIGS. 6-7 illustrate example implementations of portions of the process of FIG. 5 in accordance with embodiments of the disclosure.

Referring to FIG. 5, a UE groups a plurality of images at block 500. In an example, the image grouping of block 500 can occur via selection of image thumbnails from a photo gallery, resulting in selected image thumbnails being highlighted as in photo gallery 600 of FIG. 6 or photo gallery 705 of FIG. 7 (after image thumbnails from photo gallery 700 are selected). In another example, some or all of the grouping of the images at block 500 can be performed automatically by the UE (e.g., if a user captures a burst of images within a threshold amount of time from each other such as a few seconds, the UE may automatically group the images without user interaction). A first image among the plurality of images is then displayed by the UE at block 505. The display of the first image at block 505 may start out at a default level of zoom, as depicted in images 710-715 of FIG. 7.

While the first image is displayed by the UE, at block 510, the UE determines at least one object of interest (e.g., a person's face, a pet, an object, an eye, a wave breaking, etc.) within the first image and a desired level of zoom. The UE then determines to lock onto the object of interest in association with one or more transitions between the plurality of images at block 515. In an example, the determination of block 510 can be based upon the user converging on a particular portion of the first image, as shown in image 720 where the user zooms in upon a dog's eye, with the lock determination of block 515 being in response to the user settling on a final zoom-in location within the first image (e.g., with the dog's eye being centered), so that an object of interest can be ascertained. Alternatively, the lock determination of block 515 may be based on the user clicking or tapping on the object of interest irrespective of zoom level (e.g., the user taps on the dog's eye in image 720, which sets the zoom-lock upon the dog's eye irrespective of a current degree of zoom-in). An area of interest may also optionally be determined in conjunction with blocks 510-515.

In an example, the desired level of zoom can be indicated as a current degree of zoom that the UE is zoomed into the first image (e.g., 150%, 250%, etc.), or alternatively may be linked to the at least one object (and/or area) of interest (e.g., the user selects a person's face as the at least one object, with the desired level of zoom corresponding to whatever zoom percentage is necessary to show the person's face). In another alternative example, the user may optionally select an absolute pixel region of the first image as an area of interest, with the UE being configured to conditionally lock upon the at least one object of interest only if the at least one object of interest is in the defined absolute pixel region after an image transition.

In an example of block 510, the at least one object of interest may include multiple objects of interest. For example, a user may be interested in looking at multiple faces (e.g. baby's face, mom's face, etc.) in the image group, such that the user wishes to zoom in to the extent possible during image transitions while still being able to view each of the multiple faces. In an example, the desired level of zoom in this scenario may be to zoom in on the multiple faces to the extent possible while still keeping each face viewable (e.g., with an optional centering of the face locations such that a spacing is left between edges of the image and the face locations). In another example, if only one of the multiple faces were detected in a particular image, then the desired level of zoom would simply be to zoom in on this face (e.g., with an optional centering of the face location such that a spacing is left between edges of the image and the face location).

In an example of blocks 510-515, the UE may recommend one or more objects (and/or areas) of interest and/or the desired level of zoom to the user, which the user then agrees to or modifies (e.g., an absolute pixel region is suggested by the UE, and the user drags the absolute pixel region to cover a desired area of the first image, tweaking the level of zoom and so on). Alternatively, the user may initiate the selection of an object (and/or area) of interest and/or desired level of zoom selection. Alternatively, the UE may automatically determine the at least one object (and/or area) of interest and/or the desired level of zoom on behalf of the UE (although the user may subsequently override these auto-loaded settings, if desired).

Referring to FIG. 5, the UE determines to transition to a second image among the plurality of images at block 520. In an example, the determination of block 520 may correspond to a transition from the first image to the second image. In an alternative example, the determination of block 520 may occur after the UE has already transitioned to some other image (e.g., among the plurality of images) or even to a different application altogether (e.g., a web browser, an email application, etc.). In other words, the lock determination of block 510 may remain in effect even if the user does not transition directly to the second image from the first image. Rather, in at least one example, once an object-lock is attached to the plurality of images, the object-lock may be implemented whenever a transition to any of these images is implemented (e.g., until the object-lock is removed, which may occur in response to user input such as designation of a representative image, or after a threshold period of time, etc.). Of course, in other embodiments, the object-lock can alternatively be canceled whenever the user exits the photo gallery and/or transitions to an image in the photo gallery that is not part of the plurality of images.

Referring to block 520 of FIG. 5, in an example, it is typical for users to transition between images on a UE by swiping left or right on a screen of the UE. However, when the user zooms in on an image, swiping left or right typically causes the area of a current image to shift without actually transitioning the image. In at least one embodiment, after the UE determines the at least one object of interest within the first image and the desired level of zoom at block 510, the UE may determine to transition (e.g., at block 520) between the grouped images via user selection of a physical button (e.g., a Home button, etc.) that would not normally perform an image-transition function (e.g., a Home button being pressed would typically return the UE to a Home screen, but can instead be used to transition between images when the user indicates a desire to lock the UE to a particular set of objects or areas of interest and zoom in an image series. In an alternative example, after the user indicates the at least one object of interest within the first image and the desired level of zoom at block 510, the UE may determine to transition (e.g., at block 520) between the grouped images via user selection of a soft or virtual button.

Once the UE determines to transition to the second image at block 520, the UE detects, based on the lock determination of 515, the object of interest (e.g., the dog's eye, one or more faces of a particular person or people, etc.) within the second image at block 525, and the UE displays the second image by zooming-in upon the object of interest at a level of zoom that corresponds to the desired level of zoom at block 530 (e.g., as in image 725). As will be appreciated, this procedure permits the UE to lock upon particular object(s) at a target zoom-level while quickly transitioning from image to image without requiring the user to manually zoom-in on a desired image portion each time a new image is loaded. While not shown expressly in FIG. 5, blocks 510-515 can repeat for the same or different images in the grouped images to adjust the desired level or zoom and/or the at least one object or area of interest, so the user can fine-tune how the images are displayed.

Blocks 520-530 may repeat a number of times as the user reviews the different images. Ultimately, while not shown expressly in FIG. 5, the user may settle on one (or more than one) of the images as being the 'best' image for a particular image capture session, as reflected in photo gallery 610 of FIG. 6 and photo gallery 730 of FIG. 7 where one thumbnail of the grouped images has a checkmark. Other images from the grouped images may then either be retained on the UE or deleted based on the preference of the user. Of course, it is also possible that the user does not like any of the grouped images, in which case no 'best' image is selected. In an example, this may cause all images captured during the image capture session to be compressed or deleted.

Figure 8:
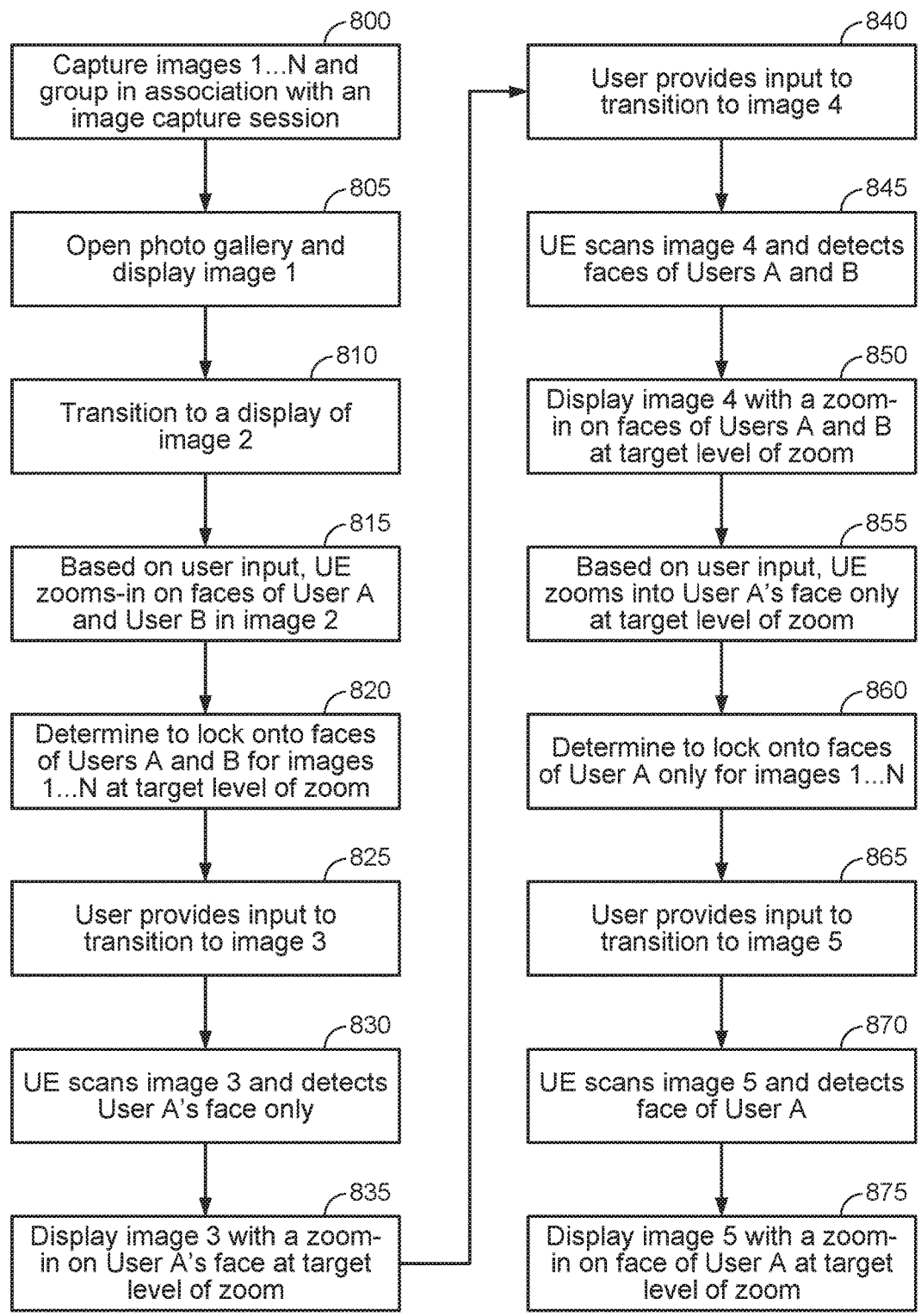
FIGS. 8-9 illustrate an example implementation of the process of FIG. 5 in accordance with an embodiment of the disclosure.
Figure 9:
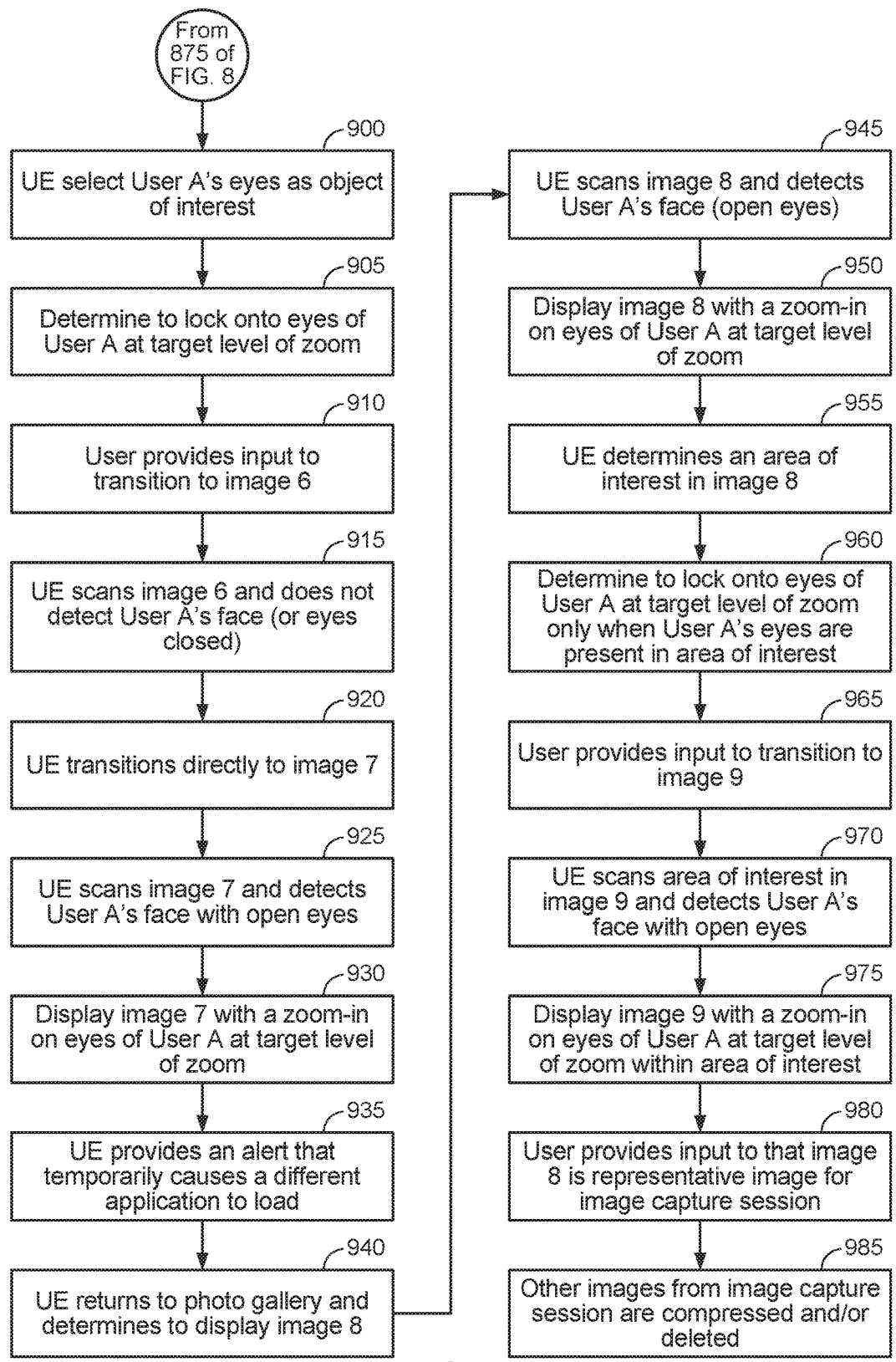

FIGS. 8-9 illustrate an example implementation of the process of FIG. 5 in accordance with an embodiment of the disclosure.

Referring to FIG. 8, at block 800, images 1 . . . N are captured and UE groups images 1 . . . N in association with an image capture session. Block 800 represents one manner in which block 500 of FIG. 5 may be implemented. In an example of block 800, a camera of the UE may group images 1 . . . N based on a shared temporal characteristic (e.g., the plurality of images being captured within a threshold period of time of each other and/or within a defined time window). In a further example of block 800, images 1 . . . N may be grouped based on the shared temporal characteristic in combination with a shared spatial characteristic (e.g., the plurality of images being captured within a threshold distance of each other and/or within a defined geographic region). As an example, the UE may capture images 1 . . . N between 7:01 and 7:04 PM on a particular day (e.g., satisfying an example shared temporal characteristic as being captured within 5 minutes of each other) while also being captured within 1000 meters of each other (e.g., satisfying an example shared spatial characteristic as being captured within 1 mile of each other).

In a further example, if the UE obtains (e.g., from another UE, via a download from a social networking service, etc.) another image that was captured 7:02 PM but at a different location (e.g., by a remote UE which shares this image with the UE), this image may be excluded from the grouping of block 800 due to the lack of the shared spatial characteristic. In another example, if an image was captured at the same location but on a different time (e.g., an hour earlier, a different day or week or year, etc.), this image may be excluded from the grouping of block 800 due to the lack of the shared temporal characteristic. In a further example, assume that the UE is operated by a user who is with a group of friends with their own respective UEs, whereby the friends in the group are each capturing images with their respective UEs and sharing them with each other. In this case, the shared images may satisfy the shared temporal and spatial characteristics despite being captured by different UEs. Hence, the fact that the UE does not capture each of images 1 . . . N is not necessarily a disqualifying criterion for the grouping of block 800 (e.g., although alternative embodiments may be directed more specifically to a self-captured image grouping for block 800 that includes a self-capture grouping condition).

Referring to FIG. 8, at block 805, the UE opens a photo gallery application and displays image 1 via a display. At block 810, assume that the UE transitions from image 1 to image 2 (e.g., in response to the user clicking an arrow to shift to the next picture, in response to the user swiping right or left on a touchscreen of the UE, etc.). At block 810, instead of simply moving onto the next image, the user provides user input (e.g., a double-tap or double-click input, a pinch-and-separate finger input on a touchscreen, etc.) causing the UE to zoom-in to a section of image 2 that depicts faces of Users A and B. Users A and B may correspond to acquaintances of the user of the UE, or one of Users A and B may correspond to the user of the UE him/herself (e.g., if the UE captured image 2 while in selfie-mode or if the UE received the UE from an external source). In an example, the faces of Users A and B may be recognized and identified as objects of interest via an object recognition module on the UE (e.g., in this facial object example, the object recognition module would be a facial recognition module).

At block 820, the UE determines to lock onto the faces of Users A and B for images 1 . . . N at a target (or desired) level of zoom. The desired level of zoom may be inferred in different ways, as noted above. For example, if the user zooms in to 150% zoom at block 815, the desired level of zoom may be set simply to 150%. In another example, the fact that multiple objects were identified as objects of interest (e.g., the faces of Users A and B) may be used to define the desired level of zoom as being the highest level of zoom where the faces of Users A and B remain viewable while an associated image is centered around the faces of Users A and B. In another example, the relative sizes of the faces of Users A and B may be used to define the level of zoom as being whatever level of zoom is necessary to view the faces of Users A and B at those particular sizes in other pictures (e.g., so if image 2 is taken while far away from Users A and B, and image 3 is taken much closer, the absolute zoom-level would not need to be as high in image 3 to view the respective faces at the same size relative to the display screen).

As will be appreciated, blocks 810, 815 and 820 represent one example implementation of blocks 505, 510 and 515 of FIG. 5, respectively. Accordingly, the first image described with respect to block 505 need not be the first image viewed (e.g., image 1 was viewed first at block 805, but no object-lock was implemented), but rather any image where an object of interest is detected at block 510 which causes a lock determination as in block 515.

Referring to FIG. 8, at block 825, user input is received at the UE that causes the UE to transition from image 2 to image 3 (e.g., as in block 520 of FIG. 5). At block 830, based on the object-lock determined at block 820, assume that the UE scans image 3 (e.g., using the object recognition module) and detects User A's face only (e.g., as in block 525 of FIG. 5). Accordingly, image 3 is displayed with a zoom-in upon User A's face at the target level of zoom at block 835 (e.g., as in block 530 of FIG. 5). In an example, the target level of zoom may be different when less than all objects of interest are detected. In one example, the faces of Users A and B may be zoomed in while keeping both faces in-view (e.g., resulting in a 135% zoom, etc.), but if the face of only one of Users A and B is detected, the zoom may be higher (e.g., 250% zoom so as to put the face into full-screen mode, etc.).

Referring to FIG. 8, at block 840, user input is received at the UE that causes the UE to transition from image 3 to image 4 (e.g., as in block 520 of FIG. 5). At block 845, based on the object-lock determined at block 820, assume that the UE scans image 4 (e.g., using the object recognition module) and detects the faces of both Users A and B (e.g., as in block 525 of FIG. 5). Accordingly, image 4 is displayed with a zoom-in upon the faces of Users A and B at the target level of zoom at block 850 (e.g., as in block 530 of FIG. 5). As noted above, the target level of zoom may be different when less than all objects of interest are detected.

Referring to FIG. 8, at block 855, instead of simply moving onto the next image, the user provides user input (e.g., a double-tap or double-click input, a pinch-and-separate finger input on a touchscreen, etc.) causing the UE to zoom-in to a section of image 4 that depicts face of User A only. At block 860, the UE determines to update the object-lock established at block 820 to a new object-lock that locks onto the face of User A only for images 1 . . . N (e.g., as in blocks 510-515). The target (or desired) level of zoom may also be updated at block 860, or alternatively the target level of zoom used when User A is the only detected face can be used as described above with respect to block 835.

Referring to FIG. 8, at block 865, user input is received at the UE that causes the UE to transition from image 4 to image 5 (e.g., as in block 520 of FIG. 5). At block 870, based on the object-lock determined at block 860, assume that the UE scans image 5 (e.g., using the object recognition module) and detects the face of User A (e.g., as in block 525 of FIG. 5). Accordingly, image 5 is displayed with a zoom-in upon the face of User A at the target level of zoom at block 875 (e.g., as in block 530 of FIG. 5).

FIG. 9 is a continuation of the process of FIG. 8 in accordance with an embodiment of the disclosure. Referring to FIG. 9, at block 900, instead of simply moving onto the next image, the user provides user input (e.g., a click or tap, etc.) that indicates a selection of User A's eyes as an object of interest (e.g., as in block 510). In other words, the user of the UE indicates that not only the face but the eyes of User A are of particular interest to the user of the UE. At block 905, the UE determines to update the object-lock established at block 860 to a new object-lock that locks onto the eyes of User A for images 1 . . . N (e.g., as in block 515). The target (or desired) level of zoom for zooming-in upon the eyes of User A may also be updated at block 905.

Referring to FIG. 9, at block 910, user input is received at the UE that causes the UE to transition from image 5 to image 6 (e.g., as in block 520 of FIG. 5). At block 915, based on the object-lock determined at block 905, assume that the UE scans image 6 (e.g., using the object recognition module) and does not detect the eyes of User A (e.g., User A is looking away from the camera in image 6, User A is not even depicted in image 6, etc.). In an example, lack of any identified objects of interest for an object-lock may cause immediate and automatic transition to a next image, as shown at block 920 via a transition from image 6 directly to image 7. In an example where images lacking any objects of interest are auto-skipped, image 6 need not even be displayed to the user at all. In another example, image 6 may be displayed briefly (e.g., so the user is aware of the image-skip). In another example, instead of auto-skipping an image without any identified objects of interest for an object-lock, the image can simply be presented with a default level of zoom.

Referring to FIG. 9, at block 925, based on the object-lock determined at block 905, assume that the UE scans image 7 (e.g., using the object recognition module) and detects the face and more particularly the eyes of User A (e.g., as in block 525 of FIG. 5). Accordingly, image 7 is displayed with a zoom-in upon the eyes of User A at the target level of zoom at block 930 (e.g., as in block 530 of FIG. 5).

Referring to FIG. 9, at block 935, assume that the UE provides an alert that temporarily causes a different application to load. For example, at block 935, the UE may receive a phone call causing a phone application to load, an email alert causing an email application to load, a text message causing a messaging application to load, a news alert causing a news application to load, and so on. At block 940, the UE returns to the photo gallery and determines to display image 8 (e.g., automatically whenever the application from block 935 is exited, via manual user operation, etc.).

Referring to FIG. 9, at block 945, based on the object-lock determined at block 905, assume that the UE scans image 8 (e.g., using the object recognition module) and detects the face and more particularly the eyes of User A (e.g., as in block 525 of FIG. 5). In this case, assume that the eyes of User A are open (as opposed to shut). Image 8 is displayed with a zoom-in upon the eyes of User A at the target level of zoom at block 950 (e.g., as in block 530 of FIG. 5), similar to block 930. Accordingly, in one example, an object-lock may be retained even if the UE temporarily transitions to a different application. In an alternative example, existing the image-viewing application with the object-lock (e.g., a photo gallery application, etc.) may reset (or cancel) the object-lock.

At block 955, while image 8 is being displayed by the UE, the UE determines an area of interest in image 8. For example, the user may manually specify a range of image 8 that is of particular interest (e.g., left-side of image 8, center of image 8, etc.). At block 960, the UE determines to update the object-lock established at block 905 to a new object-lock that locks onto the eyes of User A for images 1 . . . N only when open (e.g., as in block 515), and only when User A's open eyes are in the particular region of interest determined at block 955. For example, assume that the area of interest is the upper-right quadrant of image 8. In this case, subsequent images where User A's eyes are not in the upper-quadrant and/or are not open will result in the UE determining that no objects of interest are in those particular images. In another example, the open eyes condition for the object-lock established at block 960 may be based on express user input, passive monitoring of user behavior (e.g., the user spends more time reviewing images with open eyes for User A than closed eyes, etc.) or may be a default condition (e.g., based on general assumptions that users are not interested in pictures where important people to the user have their eyes closed, etc.). The target (or desired) level of zoom for zooming-in upon the eyes of User A may also be updated at block 960.

Referring to FIG. 9, at block 965, user input is received at the UE that causes the UE to transition from image 8 to image 9 (e.g., as in block 520 of FIG. 5). At block 970, based on the object-lock determined at block 960, assume that the UE scans the area of interest (e.g., the upper-left quadrant, etc.) in image 9 (e.g., using the object recognition module), detects the eyes of User A and further detects that User A's eyes are open (e.g., as in block 525 of FIG. 5). At block 975, image 9 is displayed with a zoom-in upon the open eyes of User A at the target level of zoom within the area of interest (e.g., as in block 530 of FIG. 5).

Referring to FIG. 8, at block 980, assume that the user of the UE provides input that indicates that image 8 is the desired image to be used as representative for the image capture session. At block 985, any non-designated images may be compressed and/or deleted from the UE. In an alternative example, instead of a single image, a subset with any number of representative images may be designated as representative of the image capture session at block 980. In a further alternative example, instead of designating which images are representative at block 980, the user may designate a subset of which image(s) are unacceptable representations of the image capture session (e.g., the user indicates the bad pictures instead of the good pictures). In this case, the designated unacceptable images may be compressed and/or deleted from the UE.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
grouping, by the UE, a plurality of images that are captured during an image capture session, wherein the grouping groups the plurality of images based on a shared temporal characteristic and a shared spatial characteristic;
displaying a first image among the plurality of images;
determining an object of interest within the first image and a desired level of zoom;
determining to lock onto the object of interest in association with one or more transitions between the plurality of images;
determining to transition to a second image among the plurality of images;
detecting, based on the lock determination, the object of interest within the second image; and
displaying the second image by zooming-in upon the object of interest at a level of zoom that corresponds to the desired level of zoom.

2. The method of claim 1, wherein the detecting includes:
scanning, in conjunction with or after the transition to the second image, the second image for the object of interest.

3. The method of claim 2, wherein the scanning is restricted to an area of interest within the second image.

4. The method of claim 3, wherein the area of interest is determined in association with the lock determination.

5. The method of claim 1, wherein the shared temporal characteristic is the plurality of images being captured within a threshold period of time of each other and/or within a defined time window.

6. The method of claim 1,
wherein the shared temporal characteristic is the plurality of images being captured within a threshold period of time of each other and/or within a defined time window, and
wherein the shared spatial characteristic is the plurality of images being captured within a threshold distance of each other and/or within a defined geographic region.

7. The method of claim 1, further comprising:
receiving a request to modify the desired level of zoom;
transitioning, after the receiving, to a new image among the plurality of images;
detecting the object of interest within the new image; and
displaying the object of interest within the new image at a level of zoom that corresponds to the modified level of zoom.

8. The method of claim 1, further comprising:
receiving a request to modify the object of interest;
transitioning, after the receiving, to a new image among the plurality of images;
detecting the modified object of interest within the new image; and displaying the modified object of interest within the new image at a level of zoom that corresponds to the desired level of zoom.

9. The method of claim 1, further comprising:
receiving a request to modify both the desired level of zoom and the object of interest;
transitioning, after the receiving, to a new image among the plurality of images;
detecting the modified object of interest within the new image; and
displaying the modified object of interest within the new image at a level of zoom that corresponds to the modified level of zoom.

10. The method of claim 1, further comprising:
receiving a user designation of a subset of the plurality of images as being acceptable representations of the image capture session.

11. The method of claim 10, further comprising:
compressing and/or deleting any non-designated images from the plurality of images that are not part of the subset.

12. The method of claim 1, further comprising:
receiving a user designation of a subset of the plurality of images as being unacceptable representations of the image capture session.

13. The method of claim 12, further comprising:
compressing and/or deleting each image that is part of the subset.

14. The method of claim 1, wherein the lock determination determines to lock onto multiple objects of interest.

15. The method of claim 14, wherein the detecting detects only one of the multiple objects of interest within the second image.

16. The method of claim 15, wherein the displaying zooms in upon and centers the one detected object of interest.

17. The method of claim 14, wherein the detecting detects at least two of the multiple objects of interest within the second image.

18. The method of claim 17, wherein the displaying zooms in upon and centers the at least two detected objects of interest.

19. The method of claim 1,
wherein the first image is a first of the plurality of images that is displayed by the UE, or
wherein the first image is transitioned to from another image from among the plurality of images, with the lock determination not being in effect for the another image.

20. The method of claim 1,
wherein the second image is transitioned to from the first image, or
wherein the second image is transitioned to from an intervening image that was transitioned to after the first image.

21. The method of claim 1,
wherein different images among the plurality of images are captured by different UEs, and
wherein each image among the plurality of images that is not captured by the UE is shared with the UE to facilitate the grouping.

22. A user equipment (UE), comprising:
means for grouping a plurality of images that are captured during an image capture session, wherein the means for grouping groups the plurality of images base on a shared temporal characteristic and a shared spatial characteristic;
means for displaying a first image among the plurality of images;
means for determining an object of interest within the first image and a desired level of zoom;
means for determining to lock onto the object of interest in association with one or more transitions between the plurality of images;
means for determining to transition to a second image among the plurality of images;
means for detecting, based on the lock determination, the object of interest within the second image; and
means for displaying the second image by zooming-in upon the object of interest at a level of zoom that corresponds to the desired level of zoom.

23. The UE of claim 22, wherein the means for detecting includes:
means for scanning, in conjunction with or after the transition to the second image, the second image for the object of interest.

24. A user equipment (UE), comprising:
at least one processor coupled to user interface output circuitry and configured to:
group a plurality of images that are captured during an image capture session, wherein the at least one processor groups the plurality of images based on a shared temporal characteristic and a shared spatial characteristic;
display a first image among the plurality of images;
determine an object of interest within the first image and a desired level of zoom;
determine to lock onto the object of interest in association with one or more transitions between the plurality of images;
determine to transition to a second image among the plurality of images;
detect, based on the lock determination, the object of interest within the second image; and
display the second image by zooming-in upon the object of interest at a level of zoom that corresponds to the desired level of zoom.

25. The UE of claim 24, wherein the at least one processor is further configured to:
scan, in conjunction with or after the transition to the second image, the second image for the object of interest.

26. A non-transitory computer-readable medium containing instructions stored thereon, which, when executed by a user equipment (UE), cause the UE to perform operations, the instructions comprising:
at least one instruction to cause the UE to group a plurality of images that are captured during an image capture session, wherein the at least one instruction to cause the UE to group causes the UE to group the plurality of images based on a shared temporal characteristic and a shared spatial characteristic;
at least one instruction to cause the UE to display a first image among the plurality of images;
at least one instruction to cause the UE to determine an object of interest within the first image and a desired level of zoom;
at least one instruction to cause the UE to determine to lock onto the object of interest in association with one or more transitions between the plurality of images;
at least one instruction to cause the UE to determine to transition to a second image among the plurality of images;

at least one instruction to cause the UE to detect, based on the lock determination, the object of interest within the second image; and at least one instruction to cause the UE to display the second image by zooming-in upon the object of interest at a level of zoom that corresponds to the desired level of zoom.

27. The non-transitory computer-readable medium of claim 26, further comprising:

at least one instruction to cause the UE to scan, in conjunction with or after the transition to the second image, the second image for the object of interest.

* * * * *